US012603224B2

(12) United States Patent
Kim et al.

(10) Patent No.: US 12,603,224 B2
(45) Date of Patent: Apr. 14, 2026

(54) MULTILAYERED CAPACITOR WITH EXTERNAL ELECTODE INCLUDING SINTERED METAL LAYER AND CONDUCTIVE RESIN LAYER

(71) Applicant: SAMSUNG ELECTRO-MECHANICS CO., LTD., Suwon-si (KR)

(72) Inventors: Seung Ah Kim, Suwon-si (KR); Chaedong Lee, Suwon-si (KR); Gyuho Yeon, Suwon-si (KR); Byungjun Jeon, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 95 days.

(21) Appl. No.: 18/400,532

(22) Filed: Dec. 29, 2023

(65) Prior Publication Data

US 2024/0282520 A1    Aug. 22, 2024

(30) Foreign Application Priority Data

Feb. 20, 2023    (KR) ........................ 10-2023-0022145

(51) Int. Cl.
| | |
|---|---|
| *H01G 4/232* | (2006.01) |
| *H01G 4/30* | (2006.01) |
| *H01G 4/008* | (2006.01) |

(52) U.S. Cl.
CPC ............. *H01G 4/2325* (2013.01); *H01G 4/30* (2013.01); *H01G 4/0085* (2013.01)

(58) Field of Classification Search
None
See application file for complete search history.

(56) References Cited

U.S. PATENT DOCUMENTS 6,381,117 B1 * 4/2002 Nakagawa ............... H01G 2/14
361/306.3
10,707,020 B2 7/2020 Onodera et al.
(Continued)

FOREIGN PATENT DOCUMENTS

| CN | 108630435 A | 10/2018 |
|---|---|---|
| EP | 1035552 B1 | 7/2007 |

(Continued)

OTHER PUBLICATIONS

The Extended European Search Report dated Jan. 20, 2025 issued in European Patent Application No. 24152386.9.

*Primary Examiner* — Eric W Thomas
(74) *Attorney, Agent, or Firm* — Morgan, Lewis & Bockius LLP

(57) ABSTRACT

A multilayered capacitor includes a capacitor body including a dielectric layer and an internal electrode, and an external electrode having a connection portion and a band portion, wherein the external electrode includes a sintered metal layer and a conductive resin layer, when an average thickness of the conductive resin layer in the connection portion is $L_b$ and an average thickness of the sintered metal layer in the connection portion is $L_a$, $L_b$ is smaller than $L_a$, and when an average thickness of the conductive resin layer in the band portion is $T_b$ and an average thickness of the sintered metal layer in the band portion is $T_a$, $T_b$ is greater than $T_a$.

16 Claims, 7 Drawing Sheets

(56)        References Cited

U.S. PATENT DOCUMENTS

| | | | |
|---|---|---|---|
| 2013/0199717 A1* | 8/2013 | Tanaka | H01G 4/30 |
| | | | 156/264 |
| 2015/0001998 A1* | 1/2015 | Katsuta | H01G 4/30 |
| | | | 336/200 |
| 2018/0268998 A1 | 9/2018 | Onodera et al. | |
| 2019/0157006 A1 | 5/2019 | Han et al. | |
| 2021/0057160 A1 | 2/2021 | Kyeong et al. | |
| 2021/0057161 A1 | 2/2021 | Zenzai et al. | |
| 2021/0082624 A1 | 3/2021 | Kim | |
| 2022/0139618 A1 | 5/2022 | Kang et al. | |
| 2022/0181087 A1 | 6/2022 | Park et al. | |

FOREIGN PATENT DOCUMENTS

| | | | |
|---|---|---|---|
| JP | 2010-226017 A | 10/2010 | |
| JP | 2015-084435 A | 4/2015 | |
| JP | 6972592 B2 | 10/2018 | |
| JP | 2021-034433 A | 3/2021 | |
| KR | 10-2019-0058239 A | 5/2019 | |
| KR | 10-2021-0037654 A | 4/2021 | |
| KR | 10-2022-0059824 A | 5/2022 | |

* cited by examiner $$L_a > L_b > L_c$$

112

121

111

122

121

111

122

113

T

W     L

MULTILAYERED CAPACITOR WITH EXTERNAL ELECTODE INCLUDING SINTERED METAL LAYER AND CONDUCTIVE RESIN LAYER

CROSS-REFERENCE TO RELATED APPLICATION

This application claims priority to and the benefit of Korean Patent Application No. 10-2023-0022145 filed in the Korean Intellectual Property Office on Feb. 20, 2023, the entire contents of which are incorporated herein by reference.

TECHNICAL FIELD

This disclosure relates to a multilayered capacitor.

BACKGROUND

Automotive electrical devices and industrial multilayered capacitors (multi-layer ceramic capacitor (MLCC) are exposed to environments where stress is concentrated around a mounting region and a solder fillet. When this stress is not relieved, the multilayered capacitor may be internally cracked, and these cracks may directly deteriorate characteristics and reliability of the multilayered capacitor.

In order to relieve the stress of the multilayered capacitor, a conductive resin layer is introduced into an external electrode. The conductive resin layer is composed of a metal and an epoxy resin, which may serve to absorb the stress applied to the mounted multilayered capacitor.

However, when the conductive resin layer is introduced into the external electrode, lifting or bursting defects may occur due to moisture absorption and metal oxidation during the long-term storage. In addition, since the conductive resin layer has much higher resistance than a sintered metal layer, as the conductive resin layer is introduced in a higher ratio, electric characteristics such as equivalent series resistance (ESR), equivalent series (ESL), and the like are more deteriorated.

Accordingly, there is a need to develop a multilayered capacitor that relieves the stress, while minimizing a volume of a resin electrode.

The information disclosed in the Background section above is to aid in the understanding of the background of the present disclosure, and should not be taken as acknowledgement that this information forms any part of prior art.

SUMMARY

One aspect of the present disclosure may be directed to a multilayered capacitor capable of suppressing crack generation, increasing equivalent series resistance (ESR), and suppressing bursting defects by relieving stress while minimizing a volume of the conductive resin layer.

A multilayered capacitor according to one aspect of the present disclosure includes a capacitor body including a dielectric layer and an internal electrode and having first and second surfaces facing each other in a stacking direction of the dielectric layer and the internal electrode, third and fourth surfaces facing each other in a longitudinal direction, and fifth and sixth surfaces facing each other in a width direction, and an external electrode having a connection portion outside the third and fourth surfaces and a band portion extending from the connection portion onto the first and second surfaces.

The external electrode includes a sintered metal layer outside the capacitor body, and a conductive resin layer disposed outside the sintered metal layer and including a resin and a conductive metal.

When an average thickness of the conductive resin layer in the connection portion is $L_b$ and an average thickness of the sintered metal layer in the connection portion is $L_a$, $L_b$ is smaller than $L_a$.

When an average thickness of the conductive resin layer in the band portion is $T_b$ and an average thickness of the sintered metal layer in the band portion is $T_a$, $T_b$ is greater than $T_a$.

The external electrode may further include a plating layer outside the conductive resin layer.

When an average thickness of the plating layer in the connection portion is $L_c$, $L_b$ may be greater than $L_c$.

When an average thickness of the conductive resin layer in the connection portion is $L_b$ and an average thickness of the sintered metal layer in the connection portion is $L_a$, $L_b \leq 0.8 \times L_a$.

An average thickness ($L_a$) of the sintered metal layer in the connection portion may be about 40 μm to about 80 μm.

An average thickness ($L_b$) of the conductive resin layer in the connection portion may be about 30 μm to about 60 μm.

An average thickness ($L_c$) of the plating layer in the connection portion) may be about 7 μm to about 20 μm.

When an average thickness of the plating layer in the band portion is $T_c$, $T_b$ may be greater than $T_c$.

An average thickness ($T_b$) of the conductive resin layer in the band portion may be greater than an average thickness ($L_b$) of the conductive resin layer in the connection portion.

An average thickness ($T_a$) of the sintered metal layer in the band portion may be about 10 μm to about 15 μm.

An average thickness ($T_b$) of the conductive resin layer in the band portion may be about 15 μm to about 30 μm.

An average thickness ($T_c$) of the plating layer in the band portion may be about 7 μm to about 15 μm.

The sintered metal layer may include a conductive metal and glass.

In the conductive resin layer, the resin may include an epoxy-based resin, and the conductive metal may include copper (Cu), silver (Ag), nickel (Ni), or a mixture thereof.

The plating layer may include nickel (Ni), copper (Cu), tin (Sn), palladium (Pd), platinum (Pt), gold (Au), silver (Ag), tungsten (W), titanium (Ti), lead (Pb), an alloy thereof, or a mixture thereof.

In the band portion, an average length of the conductive resin layer in the longitudinal direction may be greater than an average length of the sintered metal layer in the longitudinal direction.

In the band portion, an average length of the plating layer in the longitudinal direction may be greater than an average length of the conductive resin layer in the longitudinal direction.

The band portion may be disposed to extend from the connection portion onto the fifth and sixth surfaces.

The multilayered capacitor according to one aspect can relieve stress while minimizing a volume of the conductive resin layer such that generation of cracks may be suppressed, equivalent series resistance (ESR) may be increased, and bursting defects may be suppressed.

Various embodiments of the present disclosure have other features and advantages which will be apparent from or are set forth in more detail in the accompanying drawings, which are incorporated herein, and the following Detailed Description, which together serve to explain certain principles of the present disclosure.

Figure 1:
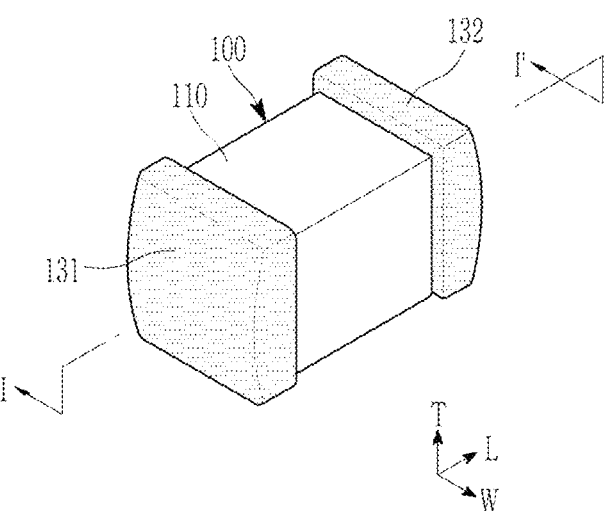
FIG. 1 is a perspective view illustrating a multilayered capacitor according to one exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION OF THE EMBODIMENTS

The present disclosure will be described more fully hereinafter with reference to the accompanying drawings, in which embodiments of the disclosure are shown. The drawings and description are to be regarded as illustrative in nature and not restrictive. Like reference numerals designate like elements throughout the specification. Further, the accompanying drawings are provided only in order to allow embodiments disclosed in the present specification to be easily understood, and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various constituent elements, and are not to be interpreted as limiting these constituent elements. The terms are only used to differentiate one constituent element from other constituent elements.

It is to be understood that when one constituent element is referred to as being "connected" or "coupled" to another constituent element, it may be connected or coupled directly to the other constituent element or may be connected or coupled to the other constituent element with a further constituent element intervening therebetween. In contrast, it should be understood that, when it is described that an element is "directly coupled" or "directly connected" to another element, no element is present between the element and the other element.

Throughout the specification, it should be understood that the term "include," "comprise," "have," or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance. Unless explicitly described to the contrary, the word "comprise" and variations such as "comprises" or "comprising" will be understood to imply the inclusion of stated elements but not the exclusion of any other elements.

Figure 2:
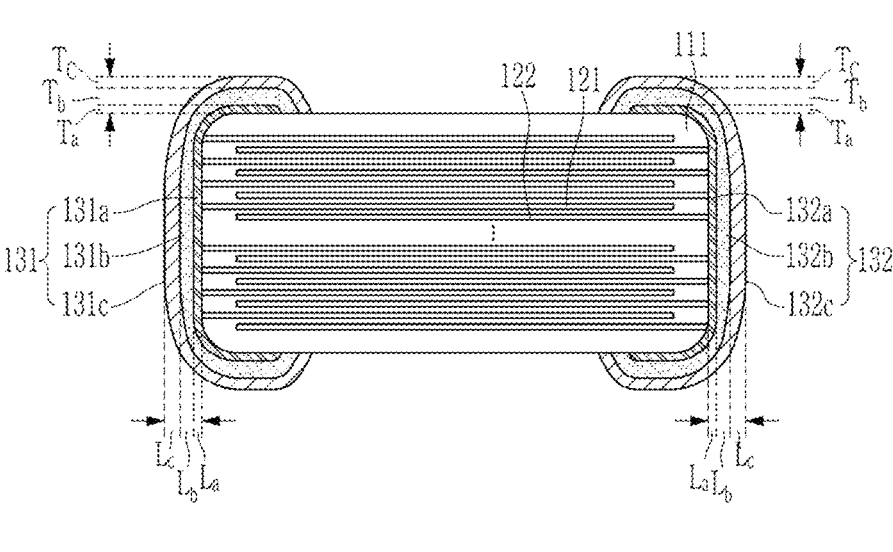
FIG. 2 is a cross-sectional view of the multilayered capacitor taken along line I-I' of FIG. 1.
Figure 2:
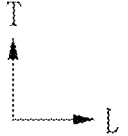
Figure 3:
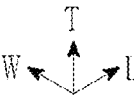
FIG. 3 is an exploded perspective view illustrating a stacked structure of internal electrodes in the capacitor body of FIG. 1.

FIG. 1 is a perspective view illustrating a multilayered capacitor according to one exemplary embodiment of the present disclosure, FIG. 2 is a cross-sectional view of the multilayered capacitor taken along line I-I' of FIG. 1, and FIG. 3 is an exploded perspective view illustrating a stacked structure of internal electrodes in the capacitor body of FIG. 1.

When directions are defined to clearly describe the present aspect, the L-axis, W-axis, and T-axis indicated in the drawings represent the longitudinal direction, the width direction, and the thickness direction of the capacitor body 110, respectively. Herein, the thickness direction (T-axis direction) may be a direction perpendicular to the wide surface (main surface) of the sheet-shaped components, and may be, for example, used in the same concept as the stacking direction in which the dielectric layers 111 are stacked. The longitudinal direction (L-axis direction) may be a direction substantially perpendicular to the thickness direction (T-axis direction) in a direction extending parallel to the wide surface (main surface) of the sheet-shaped components, and may be, for example, a direction in which the first and second external electrodes 131 and 132 are disposed. The width direction (W-axis direction) may be a direction that extends parallel to the wide surface (main surface) of the sheet-shaped components and is substantially perpendicular to the thickness direction (T-axis direction), and the length of the sheet-like components in the longitudinal direction (L-axis direction) may be longer than the length in the width direction (W-axis direction).

Referring to FIGS. 1 to 3, the multilayered capacitor 100 according to the present aspect may include the capacitor body 110, and first and second external electrodes 131 and 132 disposed at both ends of the capacitor body 110 which face each other in the longitudinal direction (L-axis direction).

The capacitor body 110 may have, for example, a substantially hexahedral shape.

In the present disclosure, for convenience of explanation, in the capacitor body 110, surfaces opposite to each other in the thickness direction (T-axis direction) are defined as first and second surfaces, surfaces connected to the first and second surfaces and facing each other in the longitudinal direction (L-axis direction) are defined as third and fourth surfaces, and surfaces connected to the first and second surfaces, connected to the third and fourth surfaces, and facing each other in the width direction (W-axis direction) are defined as fifth and sixth surfaces. For example, the first surface, which is a lower surface, may be a surface facing a mounting direction. In addition, the first to sixth surfaces may be flat, but the present embodiment is not limited thereto, for example, the first to sixth surfaces may be curved surfaces with a convex central portion, and an edge of each surface which is a boundary, may be round.

The shape and dimensions of the capacitor body 110 and the number of stacked dielectric layers 111 are not limited to those shown in the drawings of the present embodiment.

The capacitor body 110 is formed by stacking a plurality of the dielectric layers 111 in the thickness direction (T-axis direction) and then firing them, and includes a plurality of dielectric layers 111, and a plurality of first and second internal electrodes 121 and 122 which are alternately disposed in a thickness direction (T-axis direction) with the dielectric layers 111 interposed therebetween. Herein, the first and second internal electrodes 121 and 122 may have different polarities.

Herein, the boundary between the respective dielectric layers 111 adjacent to each other of the capacitor body 110 may be integrated to the extent that it is difficult to check without using a scanning electron microscope (SEM).

Also, the capacitor body 110 may include an active region and cover regions 112 and 113.

The active region contributes to generating a capacitance of the multilayered capacitor 100. For example, the active region may be a region in which the first and second internal electrodes 121 and 122 are stacked and overlapped with each other along the thickness direction (T-axis direction).

The cover regions 112 and 113 may be respectively disposed on the first and the second surfaces of the active region in the thickness direction (T-axis direction) as margin portions. The cover regions 112 and 113 may be formed by stacking a single dielectric layer 111 or two or more dielectric layers 111 on an upper surface and a lower surface of the active region, respectively.

In addition, the capacitor body 110 may further include a side cover region. The side cover region is a margin portion, and may be respectively disposed on the fifth and sixth surfaces of the active region in the width direction (W-axis direction). Such a side cover region may be formed by coating a conductive paste layer for forming an internal electrode only on a portion of the surface of the dielectric green sheet, stacking dielectric green sheets on which a conductive paste layer is not coated on both side surfaces of the dielectric green sheet, and firing the same.

The cover regions 112 and 113 and the side cover regions serve to prevent damage to the first and second internal electrodes 121 and 122 due to physical or chemical stress.

For example, the dielectric layer 111 may include a ceramic material having a high dielectric constant. For example, the ceramic material may include a dielectric ceramic containing components such as $BaTiO_3$, $CaTiO_3$, $SrTiO_3$, or $CaZrO_3$, and the like. In addition, auxiliary components such as a Mn compound, an Fe compound, a Cr compound, a Co compound, and a Ni compound may be further included in addition to these components. For example, $(Ba_{1-x}Ca_x)TiO_3$, $Ba(Ti_{1-y}Ca_y)O_3$, $(Ba_{1-x}Ca_x)$ $(Ti_{1-y}Zr_y)O_3$, or $Ba(Ti_{1-y}Zr_y)O_3$ in which Ca, Zr, etc. are partially dissolved in $BaTiO_3$-based dielectric ceramics.

In addition, a ceramic powder, a ceramic additive, an organic solvent, a plasticizer, a binder, a dispersant, and the like may be further added to the dielectric layer 111. The ceramic additive may include, for example, transition metal oxide or transition metal carbide, a rare earth element, magnesium (Mg), or aluminum (Al), and the like.

For example, an average thickness of the dielectric layer 111 may be about 0.5 μm to about 10 μm.

The first and second internal electrodes 121 and 122 are electrodes having different polarities, and are alternately disposed to face each other along the thickness direction (T-axis direction) with the dielectric layer 111 interposed therebetween, and one end thereof may be exposed through the third and fourth surfaces of the capacitor body 110.

The first and second internal electrodes 121 and 122 may be electrically insulated from each other by the dielectric layer 111 disposed in the middle.

Ends of the first and second internal electrodes 121 and 122 alternately exposed through the third and fourth surfaces of the capacitor body 110 are connected to the first and second external electrodes 131 and 132, respectively, to be electrically connected.

The first and second internal electrodes 121 and 122 may include a conductive metal, for example, a metal such as nickel (Ni), copper (Cu), silver (Ag), palladium (Pd), or gold (Au), and the like or an alloy thereof, for example an Ag—Pd alloy.

Also, the first and second internal electrodes 121 and 122 may include dielectric particles having the same composition as the ceramic material included in the dielectric layer 111.

The first and second internal electrodes 121 and 122 may be formed using a conductive paste containing a conductive metal. As a method of printing the conductive paste, a screen-printing method or a gravure printing method or the like may be used.

For example, each average thickness of the first and second internal electrodes 121 and 122 may be about 0.1 μm to about 2 μm.

The first and second external electrodes 131 and 132 are supplied with voltages of different polarities, and are electrically connected to exposed portions of the first and second internal electrodes 121 and 122, respectively.

According to the above configuration, when a predetermined voltage is applied to the first and second external electrodes 131 and 132, charges are accumulated between the first and second internal electrodes 121 and 122. At this time, a capacitance of the multilayered capacitor 100 is proportional to an overlapping area of the first and second internal electrodes 121 and 122 overlapping each other along the T-axis direction in the active region.

The first and second external electrodes 131 and 132 may respectively include first and second connection portions disposed on the third and fourth surfaces of the capacitor body 110 and connected to the first and second internal electrodes 121 and 122, and may also include first and second band portions disposed at each corner where the third and fourth surfaces of the capacitor body 110 and the first, second, fifth, and sixth surfaces thereof meet. The first and the second band portions may extend from the first and second connection portions to portions of the first, second, fifth, and sixth surfaces of the capacitor body 110, respectively. The first and second band portions may serve to improve the adhesion strength of the first and second external electrodes 131 and 132.

The first and second external electrodes 131 and 132 may include sintered metal layers 131a and 132a contacting the capacitor body 110, conductive resin layers 131b and 132b configured to cover the sintered metal layers 131a and 132a, respectively, and plating layers 131c and 132c configured to cover the conductive resin layers 131b and 132b.

The sintered metal layers 131a and 132a may include a conductive metal and glass.

For example, the sintered metal layers 131a and 132a may include copper (Cu), nickel (Ni), silver (Ag), palladium (Pd), gold (Au), platinum (Pt), tin (Sn), tungsten (W), titanium (Ti), lead (Pb), an alloy thereof, or a combination thereof, as a conductive metal, and for example the copper (Cu) may include a copper (Cu) alloy. When the conductive metal includes copper, a metal other than copper may be included in an amount of less than or equal to about 5 parts by mole based on 100 parts by mole of copper.

For example, the sintered metal layers 131a and 132a may include a composition of oxides as a glass, for example, one or more selected from a silicon oxide, a boron oxide, an aluminum oxide, a transition metal oxide, an alkali metal oxide, and an alkaline earth metal oxide. The transition metal may be selected from zinc (Zn), titanium (Ti), copper (Cu), vanadium (V), manganese (Mn), iron (Fe), and nickel (Ni); the alkali metal may be selected from lithium (Li), sodium (Na), and potassium (K); and the alkaline-earth metal may be selected from magnesium (Mg), calcium (Ca), strontium (Sr), and barium (Ba).

Each content of the conductive metal and the glass in the sintered metal layers 131a and 132a is not particularly limited, but for example, on the cross-section of the multilayered capacitor 10 cut in the longitudinal direction (L-axis direction) and thickness direction (T-axis direction) perpendicular to the width direction (W-axis direction) at the middle (½) point of the width direction (W-axis direction), an average area of the conductive metal may be about 30% to about 90% or about 70% to about 90% of a unit area of the sintered metal layers 131a and 132a.

The conductive resin layers 131b and 132b are formed on the sintered metal layers 131a and 132a, and may be for example formed to completely cover the sintered metal layers 131a and 132a.

The conductive resin layers 131b and 132b may extend to the first, second, fifth, and sixth surfaces of the capacitor body 110, and a length of the region (i.e., the band portion) where the conductive resin layers 131b and 132b extend to the first, second, fifth, and sixth surfaces of the capacitor body 110 may be longer than a length of a region (i.e., a band portion) where the sintered metal layers 131a and 132a extend to the first, second, fifth, and sixth surfaces of the capacitor body 110. That is, the conductive resin layers 131b and 132b may be formed on the sintered metal layers 131a and 132a and completely cover the sintered metal layers 131a and 132a.

The conductive resin layers 131b and 132b include a resin and a conductive metal.

The resin included in the conductive resin layers 131b and 132b is not particularly limited as long as it has bondability and impact absorption properties and can be mixed with the conductive metal powder to form a paste, and may include, for example, a phenolic resin, an acrylic resin, a silicone resin, an epoxy resin, or a polyimide resin.

The conductive metal included in the conductive resin layers 131b and 132b serves to be electrically connected to the first and second internal electrodes 121 and 122 or the sintered metal layers 131a and 132a.

The conductive metal included in the conductive resin layers 131b and 132b may have a spherical shape, a flake shape, or a combination thereof. That is, the conductive metal may be formed only in a flake shape, only in a spherical shape, or may have a mixed shape of a flake shape and a spherical shape.

Herein, the spherical shape may also include a shape that is not perfectly spherical, and may include a shape in which, for example, a length ratio between a major axis and a minor axis (long axis/short axis) is less than or equal to about 1.45. The flake-shaped powder means a powder having a flat and elongated shape, and is not particularly limited, but, for example, a length ratio between a major axis and a minor axis (long axis/short axis) may be greater than or equal to about 1.95.

The conductive resin layers 131b and 132b may include copper (Cu), silver (Ag), nickel (Ni), or a mixture thereof as a conductive metal.

The first and second external electrodes 131 and 132 may further include plating layers 131c and 132c outside the conductive resin layers 131b and 132b.

The plating layers 131c and 132c may include nickel (Ni), copper (Cu), tin (Sn), palladium (Pd), platinum (Pt), gold (Au), silver (Ag), tungsten (W), titanium (Ti), or lead (Pb), alone or an alloy thereof. For example, the plating layer 131c and 132c may be a nickel (Ni) plating layer or a tin (Sn) plating layer, and may have a form in which a nickel (Ni) plating layer and a tin (Sn) plating layer are sequentially stacked or a tin (Sn) plating layer, a nickel (Ni) plating layer, and a tin (Sn) plating layer are sequentially stacked. In addition, the plating layers 131c and 132c may include a plurality of nickel (Ni) plating layers and/or a plurality of tin (Sn) plating layers.

The plating layers 131c and 132c may improve mountability of the multilayered capacitor 100 with a board, structural reliability, external durability, heat resistance, and equivalent series resistance (ESR).

The plating layers 131c and 132c may extend to the first and second surfaces or the fifth and sixth surfaces of the capacitor body 110, and a length of the region (i.e., the band portion) where the plating layers 131c and 132c extend to the first and second surfaces or the fifth and sixth surfaces of the capacitor body 110 may be longer than a length of the region (i.e., the band portion) where the conductive resin layers 131b and 132b extend to the first and second surfaces or the fifth and sixth surfaces of the capacitor body 110. That is, the plating layers 131c and 132c may be formed on the conductive resin layers 131b and 132b and completely cover the conductive resin layers 131b and 132b.

Meanwhile, the electrical resistance of the conductive resin layers 131b and 132b is greater than that of the sintered metal layers 131a and 132a, and as the thickness of the conductive resin layers 131b and 132b increases, that is, as the volume occupied by the conductive resin layers 131b and 132b increases, the electrical resistance of the conductive resin layers 131b and 132b increases. Accordingly, electrical characteristics such as equivalent series resistance (ESR) and equivalent series inductance (ESL) of the multilayered capacitor 100 are adversely affected.

In addition, the conductive resin layers 131b and 132b include a polymer resin, and —OH (hydroxyl group) in the polymer resin improves bonding strength between the conductive resin layers 131b and 132b and the sintered metal layers 131a and 132a, but as some resins are oxidized by the conductive metal, $CO_2$ gas may be generated. The $CO_2$ gas generated by a series of reactions is present at the interface between voids in the conductive resin layers 131b and 132b and the sintered metal layers 131a and 132a, and in the process of mounting the multilayered capacitor 100 on a board, that is, the process of applying heat, lifting and bursting of the interface in the multilayered capacitor 100 may be caused.

In one exemplary embodiment of the present disclosure, by relieving stress while minimizing the volume of a resin electrode, it is possible to suppress generation of cracks, increase equivalent series resistance (ESR), and suppress burst defects.

Hereinafter, an average thickness of the sintered metal layers 131a and 132a in the first and second connection portions is referred to as $L_a$, an average thickness of the conductive resin layers 131b and 132b in the first and second connection portions is referred to as $L_b$, an average thickness of the plating layers 131c and 132c in the first and second connection portions is referred to as $L_c$, an average thickness of the sintered metal layers 131a and 132a in the first and second band portions is referred to as $T_a$, an average thickness of the conductive resin layers 131b and 132b in the first and second band portions is referred to as $T_b$, and an average thickness of the conductive resin layers 131$b$ and 132$b$ in the first and second band portion is referred to as T$_c$.

In the first and second connection portions, each thickness of the sintered metal layers 131$a$ and 132$a$, the conductive resin layers 131$b$ and 132$b$, and the plating layers 131$c$ and 132$c$ means a length in the longitudinal direction (L-axis direction) on the third and fourth surfaces.

In the first and second connection portions, each average thickness of the sintered metal layers 131$a$ and 132$a$, the conductive resin layers 131$b$ and 132$b$, and the plating layers 131$c$ and 132$c$ may be analyzed by examining the cross-section (L-axis direction and T-axis direction cross-section) of the multilayered capacitor 100 cut at the center (½ point) of the width direction (W-axis direction) perpendicular to the longitudinal direction and the stacking direction with a scanning electron microscope (SEM) or a scanning transmission electron microscope (STEM), etc. In addition, the measurement is performed at least three, five, or ten different points or on the cross-section, which are used to calculate an arithmetic mean. Other measurement methods and/or tools appreciated by one of ordinary skill in the art, even if not described in the present disclosure, may also be used.

The cross-section sample of the multilayered capacitor 100 may be, for example, prepared by mounting the multilayered capacitor 100 in an epoxy mold, polishing the multilayered capacitor 100, until the cross section thereof is exposed, and coating it for 10 seconds with a Pt coater.

The scanning electron microscope (SEM) may be, for example, Verios G4 made by ThermoFisher Scientific Inc., the measurement may be performed at about 10 kV and about 3000 magnification times, so that the first and second external electrodes 131 and 132 may be exposed outward from the interface between the first and second external electrodes 131 and 132 and the dielectric layer 111.

In the first and second connection portions, each average thickness of the sintered metal layers 131$a$ and 132$a$, the conductive resin layers 131$b$ and 132$b$, and the plating layers 131$c$ and 132$c$ may be an arithmetic mean of thicknesses of the sintered metal layers 131$a$ and 132$a$, the conductive resin layers 131$b$ and 132$b$, and the plating layers 131$c$ and 132$c$ at a total five points (the number of measurement points is not limited thereto) including two points at both sides of a reference point, which is the center (½ point) of the thickness direction (T-axis direction) of the third and fourth surfaces in the scanning electron microscope (SEM) image of the cross-section sample of the multilayered capacitor 100. Herein, the five points are located within a region with a length within about 30% of a total length of the thickness direction (T-axis direction) of the first and second connection portions. The five points may have an interval adjusted according to a scale of the scanning electron microscope (SEM) image, for example, about 10 μm to about 100 μm or about 30 μm to about 50 μm. Other measurement methods and/or tools appreciated by one of ordinary skill in the art, even if not described in the present disclosure, may also be used.

Herein, the sintered metal layers 131$a$ and 132$a$, the conductive resin layers 131$b$ and 132$b$, and the plating layers 131$c$ and 132$c$ should be present point in the longitudinal direction (L-axis direction) from the reference, but when the sintered metal layers 131$a$ and 132$a$, the conductive resin layers 131$b$ and 132$b$, and the plating layers 131$c$ and 132$c$ are not all present there, the reference point may be any one point where the sintered metal layers 131$a$ and 132$a$, the conductive resin layers 131$b$ and 132$b$, and the plating layers 131$c$ and 132$c$ are all present in the longitudinal direction (L-axis direction) among the thickness directions (T-axis direction) of the third surface and the fourth surface, for example, a ¼ point or a ¾ point.

The thickness of the sintered metal layers 131$a$ and 132$a$, the conductive resin layers 131$b$ and 132$b$, and the plating layers 131$c$ and 132$c$ in the first and second band portions, means a length of the thickness direction (T-axis direction) on the first and second surfaces. When the first and second band portions are also located even on the fifth and sixth surfaces, the thickness of the sintered metal layers 131$a$ and 132$a$, the conductive resin layers 131$b$ and 132$b$, and the plating layers 131$c$ and 132$c$ is the same as that in the first and second surfaces, except that the thickness of the sintered metal layers 131$a$ and 132$a$, the conductive resin layers 131$b$ and 132$b$, and the plating layers 131$c$ and 132$c$ means a length of the width direction (W-axis direction) on the fifth and sixth surfaces, which will not be repetitively illustrated.

In the first and second band portions, each average thickness of the sintered metal layers 131$a$ and 132$a$, the conductive resin layers 131$b$ and 132$b$, and the plating layers 131$c$ and 132$c$ may be an arithmetic mean of thicknesses of the sintered metal layers 131$a$ and 132$a$, the conductive resin layers 131$b$ and 132$b$, and the plating layers 131$c$ and 132$c$ at a total five points (the number of measurement points is not limited thereto) including two points at both sides of a reference point, which is the center (½ point) of the longitudinal direction (L-axis direction) of a region all having the sintered metal layers 131$a$ and 132$a$, the conductive resin layers 131$b$ and 132$b$, and the plating layers 131$c$ and 132$c$ in the scanning electron microscope (SEM) image of the cross-section sample of the multilayered capacitor 100. Herein, the five points are located within a region with a length within about 30% of a total length of the longitudinal direction (L-axis direction) of portions all having the sintered metal layers 131$a$ and 132$a$, the conductive resin layers 131$b$ and 132$b$, and the plating layers 131$c$ and 132$c$ The five points may have an interval adjusted according to a scale of the scanning electron microscope (SEM) image, for example, about 10 μm to about 100 μm or about 30 μm to about 50 μm. Other measurement methods and/or tools appreciated by one of ordinary skill in the art, even if not described in the present disclosure, may also be used.

Herein, the sintered metal layers 131$a$ and 132$a$, the conductive resin layers 131$b$ and 132$b$, and the plating layers 131$c$ and 132$c$ must be present in the longitudinal direction (L-axis direction) from the reference point, but when the sintered metal layers 131$a$ and 132$a$, the conductive resin layers 131$b$ and 132$b$, and the plating layers 131$c$ and 132$c$ are not all present there, the reference point may be any one point where the sintered metal layers 131$a$ and 132$a$, the conductive resin layers 131$b$ and 132$b$, and the plating layers 131$c$ and 132$c$ are all present in the thickness direction (T-axis direction) among the longitudinal directions (L-axis direction) of the first surface and the second surface, for example, a point where the sintered metal layers 131$a$ and 132$a$ are the thickest.

In addition, in the first and second band portions, each average thickness of the sintered metal layers 131$a$ and 132$a$, the conductive resin layers 131$b$ and 132$b$, and the plating layers 131$c$ and 132$c$ may be an arithmetic mean of an average thickness in the first band portion on the first surface, an average thickness in the first band portion on the second surface, an average thickness in the first band portion on the second surface, and an average thickness in the second band portion on the second surface.

The average thickness ($L_b$) of the conductive resin layers 131b and 132b in the first and second connection portions may be smaller than the average thickness ($L_a$) of the sintered metal layers 131a and 132a in the first and second connection portions. For example, $L_b \leq 0.8 \times L_a$, $L_b \leq 0.7 \times L_a$, $L_b \leq 0.6 \times L_a$, $L_b \leq 0.5 \times L_a$, $L_b \leq 0.4 \times L_a$, $L_b \leq 0.3 \times L_a$, $L_b \leq 0.2 \times L_a$, or $L_b \leq 0.1 \times L_a$.

In addition, in the first and second connection portions, the average thickness ($L_b$) of the conductive resin layers 131b and 132b is larger than the average thickness ($L_c$) of the plating layers 131c and 132c.

In other words, in the first and second connection portions, the average thickness ($L_a$) of the sintered metal layers 131a and 132a is the largest, the average thickness ($L_c$) of the plating layers 131c and 132c is the smallest, the average thickness ($L_b$) of the conductive resin layers 131b and 132b is less than or equal to about 80 based on about 100 of the average thickness ($L_a$) of the sintered metal layers 131a and 132a. When the average thickness ($L_b$) of the conductive resin layers 131b and 132b is greater than about 80 based on about 100 of the average thickness ($L_a$) of the sintered metal layers 131a and 132a, there may be more lifting and bursting defects of the first and second external electrodes 131 and 132 by $CO_2$ gas generation.

In the first and second band portions, the average thickness ($T_b$) of the conductive resin layers 131b and 132b is smaller than the average thickness ($T_a$) of the sintered metal layers 131a and 132a in the first and second band portions. When the average thickness ($T_b$) of the conductive resin layers 131b and 132b in the first and second band portions is smaller than the average thickness ($T_a$) of the sintered metal layers 131a and 132a in the first and second band portions, bending strength is deteriorated, resulting in cracks and peeling-off.

In the first and second band portions, the average thickness ($T_b$) of the conductive resin layers 131b and 132b is larger than the average thickness ($T_c$) of the plating layers 131c and 132c in the first and second band portions. When the average thickness ($T_b$) of the conductive resin layers 131b and 132b in the first and second band portions is smaller than the average thickness ($T_c$) of the plating layers 131c and 132c in the first and second band portions, the stress-relieving effect of the conductive resin layers 131b and 132b for the bending strength may be reduced, generating cracks.

The average thickness ($T_b$) of the conductive resin layers 131b and 132b in the first and second band portions is larger than the average thickness ($L_b$) of the conductive resin layers 131b and 132b in the first and second connection portions. For example, as the average thickness of the conductive resin layers 131b and 132b in the first and second connection portions is smaller, ESR is more reduced, and $CO_2$ gas is less generated, which are advantageous for lifting and bursting defects. In other words, the bending strength characteristics may not only be secured, but also ESR may be reduced by increasing the average thickness ($T_b$) of the conductive resin layers 131b and 132b in the first and second band portions greatly affecting the bending strength characteristics but thinning the average thickness ($L_b$) of the conductive resin layers 131b and 132b in the first and second connection portions greatly affecting ESR.

For example, in the first and second connection portions, the average thickness ($L_a$) of the sintered metal layers 131a and 132a may be about 40 μm to about 80 μm. In the first and second connection portions, when the average thickness ($L_a$) of the sintered metal layers 131a and 132a is less than about 40 μm, the electrodes are so thin as to be broken at the corner between the first and second connection portions and the first and second band portions, deteriorating ESR, but when greater than about 80 μm, voids may be generated.

In addition, the average thickness ($L_b$) of the conductive resin layers 131b and 132b in the first and second connection portions may be about 30 μm to about 60 μm. When the average thickness ($L_b$) of the conductive resin layers 131b and 132b in the first and second connection portions is less than about 30 μm, the bending strength may be deteriorated, or the plating may be disconnected, but when greater than about 60 μm, lifting may be generated, or ESR may be deteriorated.

In addition, in the first and second connection portions, the average thickness ($L_c$) of the plating layers 131c and 132c may be about 7 μm to about 20 μm. In the first and second connection portions, when the average thickness ($L_c$) of the plating layers 131c and 132c is less than about 7 μm, the plating may be disconnected, but when greater than about 20 μm, the bending strength may be deteriorated.

For example, in the first and second band portions, the average thickness ($T_a$) of the sintered metal layers 131a and 132a may be about 10 μm to about 15 μm. In the first and second band portions, when the average thickness ($T_a$) of the sintered metal layers 131a and 132a is less than about 10 μm, the corner portion thickness between the first and second connection portions and the first and second band portions may be so thin that the plating may be disconnected.

In addition, the average thickness ($T_b$) of the conductive resin layers 131b and 132b in the first and second band portions may be about 15 μm to about 30 μm. In the first and second band portions, when the average thickness ($T_b$) of the conductive resin layers 131b and 132b is less than about 15 μm, the bending strength may be deteriorated, but when greater than about 30 μm, mounting defects (Tombstone) may be generated.

In addition, in the first and second band portions, the average thickness ($T_c$) of the plating layers 131c and 132c may be about 7 μm to about 15 μm. In the first and second band portions, when the average thickness ($T_c$) of the plating layers 131c and 132c is less than about 7 μm, the plating may be disconnected, but when greater than about 15 μm, the bending strength may be deteriorated.

In this way, the multilayered capacitor 100 according to one exemplary embodiment of the present disclosure may relieve stress, while minimizing the volume of the conductive resin layers 131b and 132b, to suppress cracks, increase equivalent series resistance (ESR), suppress bursting defects.

A method of manufacturing the multilayered capacitor 100, in which the average thickness of the sintered metal layers 131a and 132a, the conductive resin layers 131b and 132b, and plating layers 131c and 132c in the first and second connection portions or the average thickness of the sintered metal layers 131a and 132a, the conductive resin layers 131b and 132b, and the plating layers 131c and 132c in the first and second band portions is adjusted, is not particularly limited.

For example, after forming the sintered metal layers 131a and 132a in the capacitor body 110, the conductive resin layers 131b and 132b may be formed thereon by coating a paste for a conductive resin layer on the sintered metal layers 131a and 132a, removing it with a porous non-woven fabric and the like to adjust its thickness, and then, curing it.

Hereinafter, specific examples of the invention are presented. However, the examples described below are only for specifically illustrating or explaining the invention, and the scope of the invention is not limited thereto.

Preparation Example: Manufacturing of Multilayered Capacitor

A paste including barium titanite (BaTiO$_3$) powder is coated on a carrier film and then dried, manufacturing a plurality of dielectric green sheets.

A conductive paste including nickel (Ni) is screen-printed on each dielectric green sheet to form a conductive paste layer.

A dielectric green sheet stack is manufactured by stacking the plurality of dielectric green sheets, while at least each portion of the conductive paste layers thereon is overlapped.

The dielectric green sheet stack is cut into individual chips, which are maintained under an air atmosphere at 230° C. for 60 hours to remove a binder and then fired at 1200° C., manufacturing a capacitor body.

Next, a paste for the sintered metal layer containing copper (Cu) as the glass and conductive metal is coated on the outer surface of the capacitor body by dip method, dried, and sintered to form the sintered metal layer. Herein, in the first and second connection portions, the average thickness of the sintered metal layer may be about 40 μm to about 50 μm, and in the first and second band portions, the average thickness of the sintered metal layer may be about 15 μm to about 20 μm.

Next, the paste for a conductive resin layer including an epoxy resin and copper (Cu) as a conductive metal is dip-coated outside of the capacitor body, removed by using a porous non-woven fabric to adjust a thickness in the first and second connection portions and the first and second band portions as shown in Tables 1 and 2, and cured to form a conductive resin layer.

After forming the conductive resin layer, nickel (Ni) and tin (Sn) plating proceeds to form each multilayered capacitor according to examples and comparative examples. Herein, an average thickness of a plating layer in the first and second connection portions and the first and second band portions may be about 7 μm to about 10 μm.

Experimental Example 1

The multilayered capacitors manufactured in the preparation examples are measured with respect to each average thickness of sintered metal layers, conductive resin layers, and plating layers in the first and second connection portions and the first and second band portions.

The manufactured multilayered capacitors are respectively mounted in an epoxy mold, polished to a depth of about ½ along the W-axis direction on the L-axis direction and T-axis direction surface (e.g., fifth surface), and coated for 10 seconds with a Pt coater, preparing cross-section samples.

The prepared cross-section samples are measured at positions where the first or second connection portions and the first or second band portions are visible by using SEM (Scanning Electron Microscope) in a BSE mode at an acceleration voltage of 10 kV and an analysis magnification of 3000 times.

Since the method of measuring the average thickness of the sintered metal layer, the conductive resin layer, and the plating layer in the scanning electron microscope (SEM) image is the same as described above, a repetitive description will be omitted.

Figure 4:
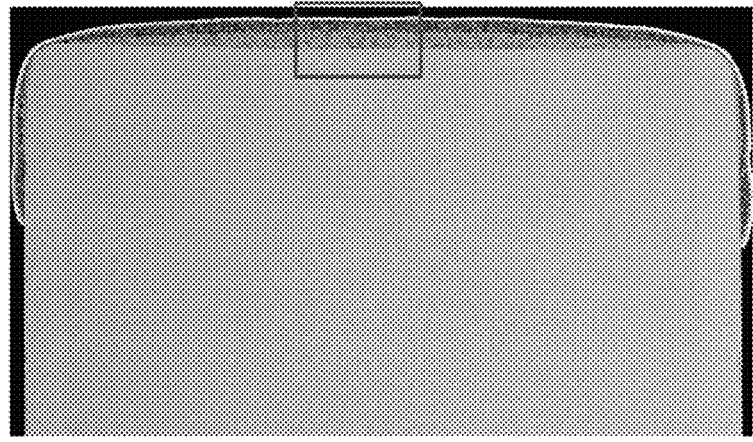
FIG. 4 is a scanning electron microscope photograph of the connection portion of the multilayered capacitor manufactured in Example 1.
Figure 5:
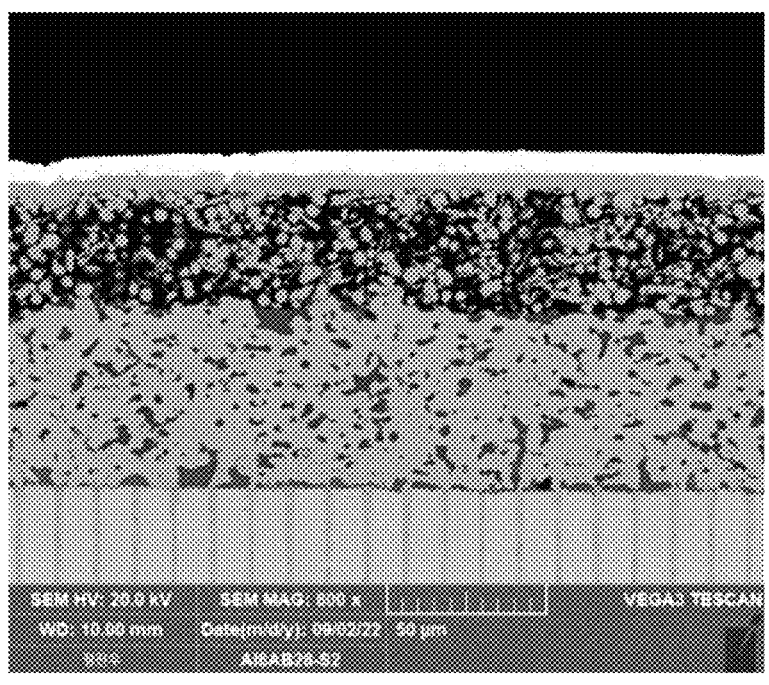
FIG. 5 is a scanning electron microscope image of an enlarged portion of FIG. 4.

FIG. 4 is a scanning electron microscope photograph of the first connection portion of the multilayered capacitor manufactured in Example 1, and FIG. 5 is an enlarged scanning electron microscope image of a red boxed portion in FIG. 4. FIG. 5 is used to measure each average thickness of the sintered metal layer, the conductive resin layer, and the plating layer in the first connection portion.

Figure 6:
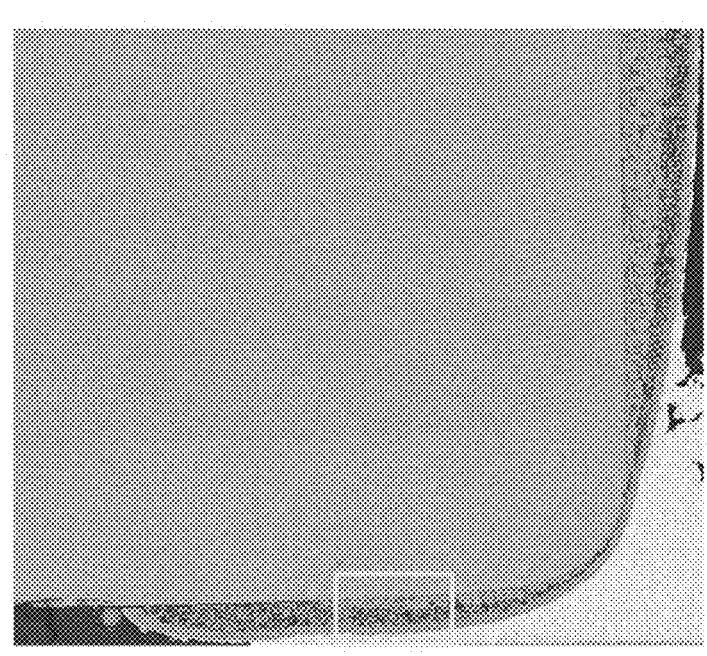
FIG. 6 is a scanning electron microscope photograph of a band portion measured in the multilayered capacitor manufactured in Example 1.
Figure 7:
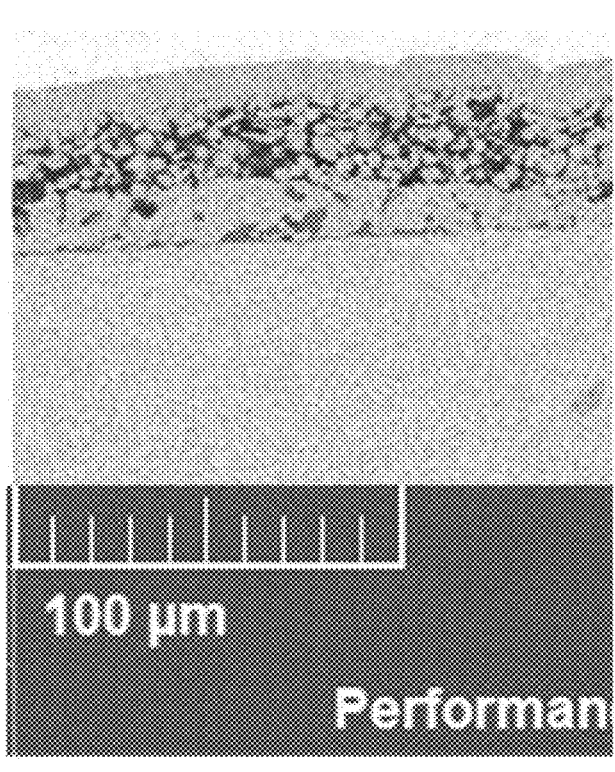
FIG. 7 is a scanning electron microscope image of an enlarged portion of FIG. 6.

FIG. 6 is a scanning electron microscope photograph of a first band portion measured in the multilayered capacitor manufactured in Example 1, and FIG. 7 is an enlarged scanning electron microscope image of a yellow boxed portion in FIG. 6. FIG. 7 is used to measure each average thickness of the sintered metal layer, the conductive resin layer, and the plating layer in the first band portion.

Experimental Example 2

The multilayered capacitors manufactured in the preparation examples are measured with respect to equivalent series resistance (ESR).

Each of the multilayered capacitors according to the examples and the comparative examples is prepared by 100. The multilayered capacitors are respectively mounted (soldered) on a board (PCB) and put in a reflow facility with a peak temperature of 265° C. The reflowed board is put into an impedence analyzer and measured with respect to ESR under a frequency of 1 MHz.

The ESR measurement may be performed by using, for example, an impedance analyzer made by JK Tech, Inc.

In addition, the multilayered capacitors according to the examples and the comparative examples are measured whether CO$_2$ gas is generated or not by using an EGS-MS equipment.

The multilayered capacitors according to the examples and the comparative examples are stored for 30 days, and two of each of the multilayered capacitors are put in a chamber and measured with respect to an area of CO$_2$ gas generated therefrom, while heated at 10° C./min from room temperature to 265° C. under an N$_2$ gas atmosphere. Herein, an amount of the generated CO$_2$ gas corresponds to an area (44 m/z) measured from 150° C. to 250° C., and the corresponding area is for relative comparison only due to characteristics of the EGS-MS equipment.

In addition, whether the multilayered capacitors according to the examples and the comparative examples are lifted or not is checked.

Each of the multilayered capacitors according to the examples and comparative examples is prepared by 20. After mounting (soldering) each of the multilayered capacitors on a board (PCB) and putting it in a reflow facility with a peak temperature of 265° C., 5 times' reflows proceed. Subsequently, an X-ray equipment is used to check whether there is lifting between the conductive resin layer and the sintered metal layer.

TABLE 1

| Connection portion | | | CO₂ extraction mass area | | | Frequency of occurrence of excitations | | Quality | |
|---|---|---|---|---|---|---|---|---|---|
| sintered metal layer thickness ratio | conductive resin layer thickness ratio | ESR | 1 measure-ment | 2 measure-ment | average | excitation | ESR | Excitation | Final |
| Comp. Ex. 1 | 1 | 1 | 25 | 3.10E+07 | 2.80E+07 | 2.95E+07 | 3/20 | Δ | X | X |
| Comp. Ex. 2 | 1 | 0.9 | 20 | 2.60E+07 | 2.60E+07 | 2.60E+07 | 1/20 | ○ | X | X |
| Ex. 1 | 1 | 0.8 | 16 | 2.20E+07 | 1.90E+07 | 2.05E+07 | 0/20 | ○ | ○ | ○ |
| Ex. 2 | 1 | 0.6 | 6 | 1.80E+07 | 1.80E+07 | 1.80E+07 | 0/20 | ○ | ○ | ○ |

Referring to Table 1, when the conductive resin layer has an average thickness of less than or equal to 80 based on 100 of an average thickness of the sintered metal layer in the connection portions, there is no problem of ESR and lifting, and in multilayered capacitors having no lifting, $CO_2$ gas just in a small amount is generated.

In addition, the multilayered capacitors according to the examples and comparative examples are measured with respect to the bending strength.

Each of the multilayered capacitors according to the examples and comparative examples is prepared by 20. The multilayered capacitors are respectively mounted (soldered) on a bending strength board (PCB) and then, fixed thereto after reflows.

Herein, a bending strength measuring equipment may be, for example, TT28025S, Keithely 6485*4, Keithely 6487*1 made by Tira.

The bending strength is evaluated by conducting a three-point bending experiment, wherein the board mounted with the multilayered capacitor is placed between two supports at an interval of 90 mm, so that the multilayered capacitor may be in the middle, and connected to a measuring instrument to measure initial charge charging and a leakage current during the evaluation. When the connection is completed, the bending strength-measuring equipment is used to push the board to bend the multilayered capacitor and simultaneously, check whether charges charged in the multilayered capacitor are leaked in a current-measuring method, when 5 mm pressed down. Subsequently, a cross-section of the multilayered capacitor is examined to determine its defect mode.

TABLE 2

| Band portion | | | Bending strength | | |
|---|---|---|---|---|---|
| Thick-ness ratio of sintered metal layer | Thick-ness ratio of conductive resin layer | Thick-ness ratio of plating layer | Number of cracks | Number of occur-rences of peel off | Quality |
| Ex. 1 | 1 | 1.2 | 0.5 | 0/20 | 0/20 | ○ |
| Ex. 2 | 1 | 1 | 0.5 | 0/20 | 3/20 | Δ |
| Comp. Ex. 1 | 1 | 0.5 | 0.5 | 3/20 | 2/20 | X |
| Comp. Ex. 2 | 1 | 0.45 | 0.5 | 6/20 | 0/20 | X |

Referring to Table 2, in order to guarantee the bending strength quality, an average thickness of the conductive resin layer in a band portion should be thicker than an average thickness of the sintered metal layer and an average thickness of the plating layer, and in the band portion, the thicker the average thickness of the conductive resin layer, the more advantageous the bending strength characteristics.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

DESCRIPTION OF SYMBOLS

100: multilayered capacitor
110: capacitor body
111: dielectric layer
112, 113: cover region
121: first internal electrode
122: second internal electrode
131: first external electrode
132: second external electrode
131a, 132a: sintered metal layer
131b, 132b: conductive resin layer
131c, 132c: plating layer

What is claimed is:

1. A multilayered capacitor, comprising
   a capacitor body including a dielectric layer and an internal electrode and having first and second surfaces facing each other in a stacking direction of the dielectric layer and the internal electrode, third and fourth surfaces facing each other in a longitudinal direction, and fifth and sixth surfaces facing each other in a width direction, and
   an external electrode having a connection portion outside the third and fourth surfaces and a band portion extending from the connection portion onto the first and second surfaces,
   wherein the external electrode includes a sintered metal layer outside the capacitor body, and a conductive resin layer disposed outside the sintered metal layer and including a resin and a conductive metal,
   when an average thickness of the conductive resin layer in the connection portion is $L_b$ and an average thickness of the sintered metal layer in the connection portion is $L_a$, $L_b \leq 0.8 \times L_a$, when an average thickness of the conductive resin layer in the band portion is $T_b$ and an average thickness of the sintered metal layer in the band portion is $T_a$, $T_b$ is greater than $T_a$, and the average thickness ($T_b$) of the conductive resin layer in the band portion is about 15 μm to about 30 μm.

2. The multilayered capacitor of claim 1, wherein the external electrode further includes a plating layer outside the conductive resin layer.

3. The multilayered capacitor of claim 2, wherein when an average thickness of the plating layer in the connection portion is $L_c$, $L_b$ is greater than $L_c$.

4. The multilayered capacitor of claim 2, wherein an average thickness ($L_c$) of the plating layer in the connection portion is about 7 μm to about 20 μm.

5. The multilayered capacitor of claim 2, wherein when an average thickness of the plating layer in the band portion is $T_c$, $T_b$ is greater than $T_c$.

6. The multilayered capacitor of claim 2, wherein an average thickness ($T_c$) of the plating layer in the band portion is about 7 μm to about 15 μm.

7. The multilayered capacitor of claim 2, wherein the plating layer includes nickel (Ni), copper (Cu), tin (Sn), palladium (Pd), platinum (Pt), gold (Au), silver (Ag), tungsten (W), titanium (Ti), lead (Pb), an alloy thereof, or a mixture thereof.

8. The multilayered capacitor of claim 2, wherein in the band portion, an average length of the plating layer in the longitudinal direction is greater than an average length of the conductive resin layer in the longitudinal direction.

9. The multilayered capacitor of claim 1, wherein the average thickness ($L_a$) of the sintered metal layer in the connection portion is about 40 μm to about 80 μm.

10. The multilayered capacitor of claim 1, wherein the average thickness ($L_b$) of the conductive resin layer in the connection portion is about 30 μm to about 60 μm.

11. The multilayered capacitor of claim 1, wherein the average thickness ($T_b$) of the conductive resin layer in the band portion is greater than the average thickness ($L_b$) of the conductive resin layer in the connection portion.

12. The multilayered capacitor of claim 1, wherein the average thickness ($T_a$) of the sintered metal layer in the band portion is about 10 μm to about 15 μm.

13. The multilayered capacitor of claim 1, wherein the sintered metal layer includes a conductive metal and glass.

14. The multilayered capacitor of claim 1, wherein in the conductive resin layer, the resin includes an epoxy-based resin, and the conductive metal includes copper (Cu), silver (Ag), nickel (Ni), or a mixture thereof.

15. The multilayered capacitor of claim 1, wherein in the band portion, an average length of the conductive resin layer in the longitudinal direction is greater than an average length of the sintered metal layer in the longitudinal direction.

16. The multilayered capacitor of claim 1, wherein the band portion is disposed to extend from the connection portion onto the fifth and sixth surfaces.

* * * * *